July 21, 1936.  N. DIEHL  2,048,324

BEARING

Filed March 19, 1934

Neil Diehl Inventor

By [signature] Attorneys.

Patented July 21, 1936

2,048,324

UNITED STATES PATENT OFFICE 2,048,324

BEARING

Neil Diehl, Douglas, Wyo.

Application March 19, 1934, Serial No. 716,359

1 Claim. (Cl. 308—187)

This invention aims to provide a novel connection between a pitman and a rotatable member, such as a fly wheel or crank disk, the device being of peculiarly effective use on a mower or other agricultural implement, although the device is not confined to that use.

The invention aims to provide novel means for housing the bearings, for lubricating them, and, generally, to improve and enhance the utility of devices of that type to which the invention appertains.

Although a preferred form of the invention has been shown, a skilled mechanic, working within the scope of what is claimed, may make changes, without departing from the spirit of the invention.

Figure 1:
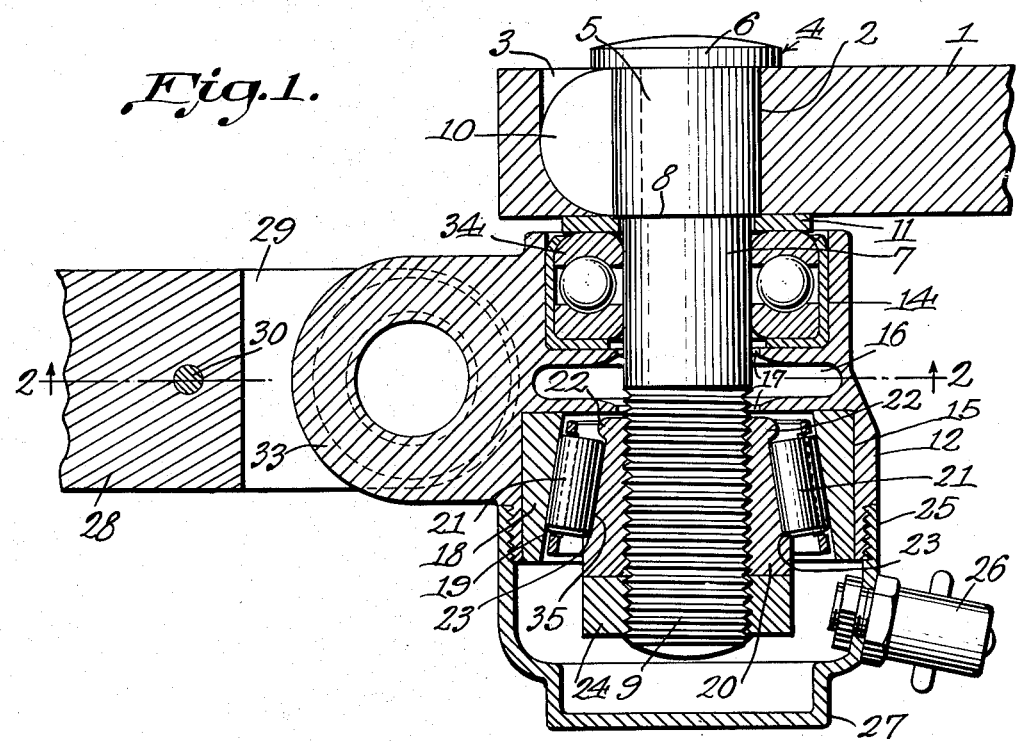
Fig. 1 shows in section, a device constructed in accordance with the invention.
Figure 2:
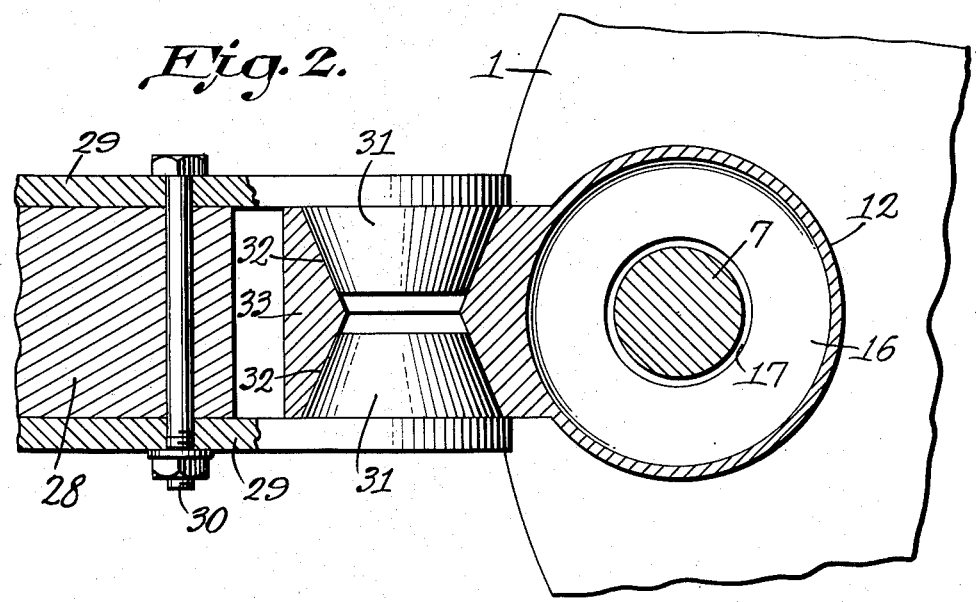
Fig. 2 is a section on the line 2—2 of Fig. 1.

The numeral 1 marks a rotatable member, such as a fly wheel or disk. The rotatable member 1 is provided near to its periphery with a bore 2. There is a slot 3 in the rotatable member 1, and the slot 3 communicates with the bore 2.

The numeral 4 marks a wrist pin. The wrist pin 4 includes a body 5 having a head 6, a reduced intermediate portion 7 defining a shoulder 8, and a threaded end 9. The body 5 of the wrist pin 4 is received in the bore 2 of the rotatable member 1. The shoulder 8 is approximately flush with the inner surface of the rotatable member 1. A key 10 is mounted in the slot 3 of the rotatable member 1 and engages the body 5 of the wrist pin 4 to hold the wrist pin against rotation. The key 10 is held in the slot 3 by the head 6 of the wrist pin 4. A spacing washer 11 surrounds the intermediate portion 7 of the wrist pin 4 and abuts against the shoulder 8.

The numeral 12 marks a barrel. The barrel 12 has an inner recess 14, an outer recess 15, and a lubricant chamber 16 between the recesses. In the walls of the chamber 16 there are openings 17 leading, respectively, to the recesses 14 and 15, the openings 17 being somewhat greater in diameter than the parts 9 and 7 of the wrist pin.

A thrust bearing 34, which may be a ball bearing, is removably mounted in the inner recess 14 of the barrel 12 and is disposed about the intermediate portion 7 of the wrist pin 4. The thrust bearing 34 thus is engaged with the spacing washer 11, which, in its turn, is engaged with the shoulder 8 on the wrist pin.

A first race 18 is mounted in the outer recess 15 of the barrel 12. The first race 18 has a conical inner surface 19. A second race 20 is threaded on the part 9 of the wrist pin 4 and is located within the first race 18. The second race 20 has a conical outer surface 35. A roller bearing 21 is interposed between the surface 19 of the race 18 and the surface 35 of the race 20. The roller bearing 21 is held on the second race 20 by spaced annular shoulders 22 and 23 on the said race. The second race 20 is prevented from threading off the part 9 of the wrist pin 4 by any suitable means, such as a lock nut 24 threaded on the part 9 of the wrist pin.

A cap 25 is threaded on the outer end of the barrel 12. The cap 25 carries means 26 for the admission of a lubricant under pressure. The cap 25 is provided at its outer end with a wrench head 27, whereby the cap can be conveniently threaded on and off the barrel 12.

The numeral 28 designates a pitman. Any suitable means may be supplied for securing the barrel 12 to the pitman 28. If desired, side plates 29 may be attached by securing members 30, such as bolts, to the inner end of the pitman 28. The side plates 29 may be provided with inwardly-extended conical projections 31, received in correspondingly shaped seats 32, formed in an extension 33 on the barrel 12.

The bearing 34 cares for the thrust, and the roller bearing 21 facilitates rotation of the barrel 12. The lubricant is forced into the cap 25 through the device shown at 26, and the bearing 21 will be adequately lubricated. A quantity of the lubricant will find it way into the chamber 16 and will be stored there, the lubricant ultimately finding its way from the chamber 16 to the thrust bearing 34.

The device forming the subject matter of this application is advantageous over old style devices, in that it is dust proof, practically wear proof, and so constructed that it will retain a sufficient supply of oil to last several days. It is obvious that looseness can be taken up by threading the race 20 toward the rotatable member 1 and holding the race in its adjusted position by means of the lock nut 24 or its equivalent.

Having thus described the invention what is claimed is:

In a device of the class described, a barrel, a pin in the barrel, the barrel being provided intermediate its ends with inner and outer partitions extended transversely toward the axis of the barrel into close but spaced relation to the pin, the partitions being spaced from each other to define therebetween an inner lubricant chamber of greater diameter than length, thereby affording ample lubricant storage with a minimum length of barrel, the inner partition forming an inner recess in the extreme inner end of the barrel, a ball thrust bearing receiving the pin and mounted in the inner recess, in engagement with the inner partition, means, including a shoulder on the pin and external to the barrel, for holding the ball thrust bearing in the inner recess, in engagement with the inner partition, the outer partition forming an outer recess in the extreme outer end of the barrel, a first race in the outer recess, in engagement with the outer partition, a second race within the first race, roller bearings between the races, the second race being threaded on the pin, and acting, through the roller bearings, to hold the first race in the outer recess and in engagement with the outer partition, and to hold the inner end of the second race spaced from the outer partition, a nut threaded on the pin and holding the second race against unthreading, a cap detachably mounted on the outer end of the barrel and spaced from the nut and from the end of the pin, to form an outer lubricant chamber, and means on the cap for admitting lubricant to the outer lubricant chamber.

NEIL DIEHL.